United States Patent
Feng et al.

(10) Patent No.: US 11,946,674 B2
(45) Date of Patent: Apr. 2, 2024

(54) AIR CONDITIONING SYSTEM AND COOLING METHOD FOR DRIVE MOTOR THEREOF

(71) Applicant: Carrier Corporation, Palm Beach Gardens, FL (US)

(72) Inventors: Xi Feng, Shanghai (CN); Shuguang Zhang, Shanghai (CN); Jun Cao, Shanghai (CN); Hao Zhao, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 88 days.

(21) Appl. No.: 17/254,930

(22) PCT Filed: Sep. 11, 2020

(86) PCT No.: PCT/US2020/050382
§ 371 (c)(1),
(2) Date: Dec. 22, 2020

(87) PCT Pub. No.: WO2021/050859
PCT Pub. Date: Mar. 18, 2021

(65) Prior Publication Data
US 2022/0196298 A1 Jun. 23, 2022

(30) Foreign Application Priority Data

Sep. 12, 2019 (CN) .......................... 201910863348.6

(51) Int. Cl.
*F25B 31/00* (2006.01)
*F25B 1/10* (2006.01)
(Continued)

(52) U.S. Cl.
CPC .............. *F25B 31/006* (2013.01); *F25B 1/10* (2013.01); *F25B 5/02* (2013.01); *F25B 41/22* (2021.01);
(Continued)

(58) Field of Classification Search
CPC .. F25B 31/006; F25B 1/10; F25B 2600/2515; F25B 2700/1933
See application file for complete search history.

(56) References Cited

U.S. PATENT DOCUMENTS

| 3,859,815 A | 1/1975 | Kasahara |
| 6,070,421 A | 6/2000 | Petrovich et al. |

(Continued)

FOREIGN PATENT DOCUMENTS

| WO | 2014082177 A1 | 6/2014 |
| WO | 2016003467 A1 | 1/2016 |

OTHER PUBLICATIONS

International Search Report and Written Opinion for Application No. PCT/US2020/050382; dated Dec. 15, 2020; 13 Pages.

*Primary Examiner* — Lionel Nouketcha
(74) *Attorney, Agent, or Firm* — CANTOR COLBURN LLP

(57) ABSTRACT

An air conditioning system includes a main circuit having a multi-stage compressor, a condenser, a throttling element and an evaporator connected by pipelines; and a cooling branch, the inlet of which is connected to the main circuit between the condenser and the throttling element, and the outlet of which is connected to at least one of the first-stage suction port and the intermediate-stage suction port of the multi-stage compressor, wherein refrigerant from the cooling branch flows through the drive motor of the multi-stage compressor, and a regulating valve for controlling the opening of the cooling branch is provided on the cooling branch; and a control module that controls the opening of the (Continued)

regulating valve on the cooling branch based on the temperature of the outlet downstream of the drive motor on the cooling branch and the intermediate suction pressure of the intermediate-stage suction port of the multi-stage compressor.

10 Claims, 1 Drawing Sheet

(51) Int. Cl.
  *F25B 5/02* (2006.01)
  *F25B 41/22* (2021.01)
  *F25B 49/02* (2006.01)
  *H02P 29/60* (2016.01)

(52) U.S. Cl.
  CPC .............. *F25B 49/02* (2013.01); *H02P 29/60* (2016.02); *F25B 2400/05* (2013.01); *F25B 2600/2513* (2013.01); *F25B 2600/2515* (2013.01); *F25B 2700/1933* (2013.01); *F25B 2700/2115* (2013.01)

(56) References Cited

U.S. PATENT DOCUMENTS

| | | | |
|---|---|---|---|
| 8,418,482 B2 * | 4/2013 | Bush | ................ F25B 9/008 62/513 |
| 2002/0050149 A1 | 5/2002 | Kawada | |
| 2006/0086110 A1 | 4/2006 | Manole | |

* cited by examiner

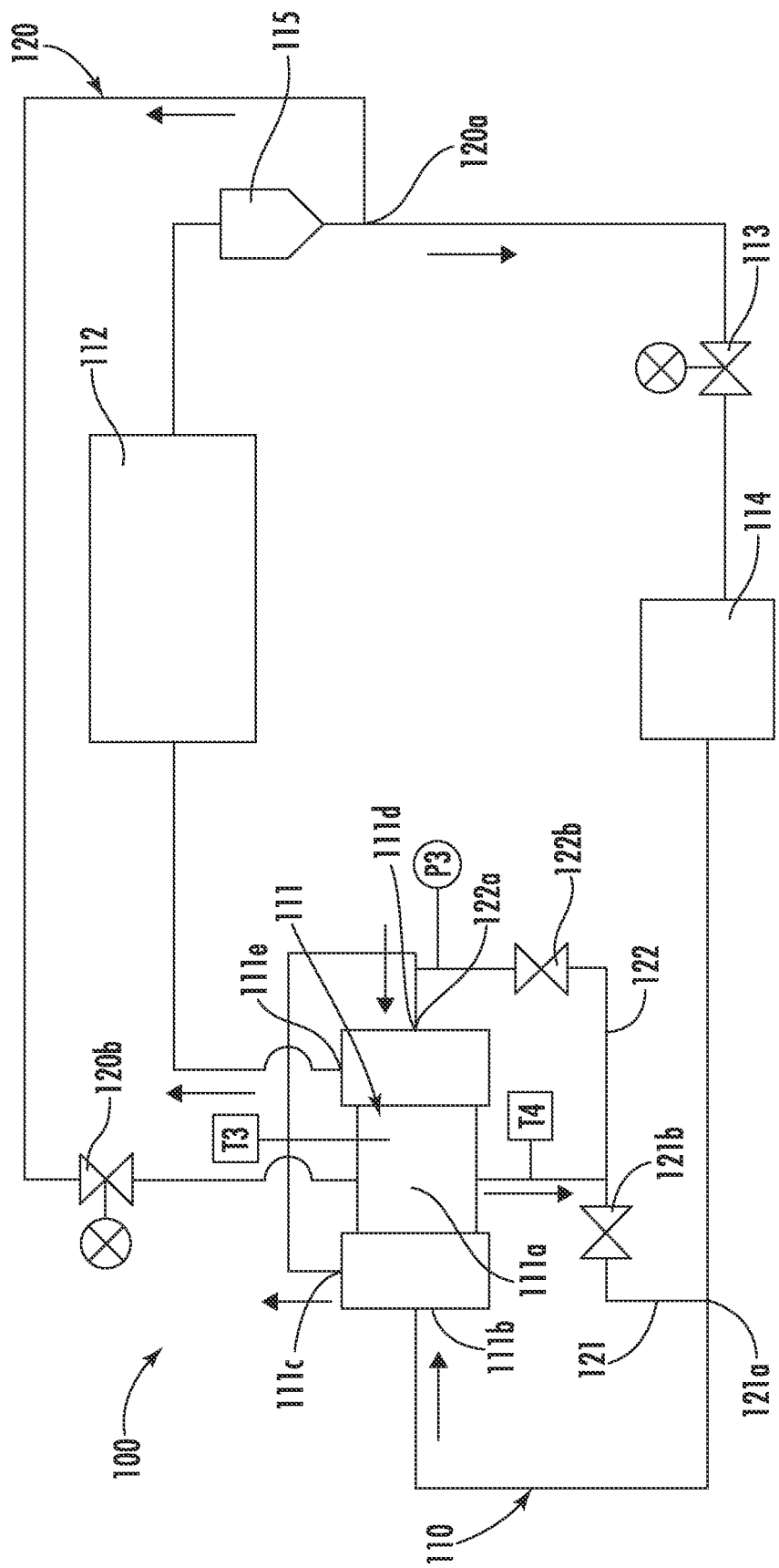

AIR CONDITIONING SYSTEM AND COOLING METHOD FOR DRIVE MOTOR THEREOF

CROSS REFERENCE TO RELATED APPLICATIONS

This application is a National Stage of International Application Serial No. PCT/US2020/050382, filed Sep. 11, 2020, which claims the benefit of Chinese Application No. 201910863348.6, filed on Sep. 12, 2019, which is incorporated herein by reference in its entirety.

FIELD OF THE INVENTION

The present application relates to the field of air conditioning. More specifically, the present application relates to an air conditioning system and a cooling method for drive motor thereof.

BACKGROUND OF THE INVENTION

In the field of air conditioning, for a refrigeration system, during its operation, the drive motor of the compressor will generate a lot of heat, so it needs to be cooled by such medium as refrigerant or coolant oil to avoid excessively high temperature that may cause motor or system failure. This is particularly serious in refrigeration systems with hermetic compressors. In addition, for an air conditioning system with multi-stage compression, a suitable motor cooling scheme may even affect system efficiency.

SUMMARY OF THE INVENTION

The present application provides an air conditioning system and a cooling method for drive motor thereof, to maintain or improve system efficiency while cooling the drive motor.

To achieve at least one objective of the present application, in accordance with one aspect of the present application, an air conditioning system is provided, which comprises: a main circuit having a multi-stage compressor, a condenser, a throttling element and an evaporator connected by pipelines; a cooling branch, the inlet of which is connected to the main circuit between the condenser and the throttling element, and the outlet of which is connected to at least one of a first-stage suction port and an intermediate-stage suction port of the multi-stage compressor, wherein refrigerant from the cooling branch flows through the drive motor of the multi-stage compressor, and a regulating valve for controlling the opening of the cooling branch is provided on the cooling branch; and a control module that controls the opening of the regulating valve on the cooling branch based on the temperature of the outlet downstream of the drive motor on the cooling branch and the intermediate suction pressure of the intermediate-stage suction port of the multi-stage compressor.

Optionally, the cooling branch comprises a first branch and a second branch connected to the multi-stage compressor from downstream of the drive motor on the cooling branch; wherein, the first branch comprises a first valve that controls the opening and closing thereof and a first outlet connected to the first-stage suction port of the multi-stage compressor; and the second branch comprises a second valve that controls the opening and closing thereof and a second outlet connected to the intermediate-stage suction port of the multi-stage compressor.

Optionally, the control module controls the opening and closing of the first outlet and/or the second outlet on the cooling branch based on the temperature of the drive motor.

Optionally, the multi-stage compressor is a screw compressor or a centrifugal compressor.

To achieve at least one objective of the present application, in accordance with another aspect of the present application, a cooling method for a drive motor of an air conditioning system for use in the aforementioned air conditioning system is further provided, which comprises: detecting the temperature of the outlet downstream of the drive motor on the cooling branch and the intermediate suction pressure of the intermediate-stage suction port of the multi-stage compressor; when the difference between the temperature of the outlet and the saturation temperature corresponding to the intermediate suction pressure is greater than the preset superheat temperature, increasing the opening of the regulating valve; or, when the difference between the temperature of the outlet and the saturation temperature corresponding to the intermediate suction pressure is smaller than the preset superheat temperature, decreasing the opening of the regulating valve.

Optionally, the method comprises: detecting the temperature of the drive motor; when the temperature of the drive motor is greater than a preset cooling temperature, turning on the first branch; or, when the temperature of the drive motor is smaller than the preset cooling temperature, turning on the second branch.

In order to achieve at least one objective of the present application, in accordance with another aspect of the present application, an air conditioning system is further provided, which comprises: a main circuit having a multi-stage compressor, a condenser, a throttling element and an evaporator connected by pipelines; and a cooling branch, the inlet of which is connected to the main circuit between the condenser and the throttling element, wherein refrigerant from the cooling branch flows through the drive motor of the multi-stage compressor, and wherein the cooling branch further comprises a first branch and a second branch connected to the multi-stage compressor from downstream of the drive motor; wherein, the first branch comprises a first valve that controls the opening and closing thereof and a first outlet connected to the first-stage suction port of the multi-stage compressor; and the second branch comprises a second valve that controls the opening and closing thereof and a second outlet connected to the intermediate-stage suction port of the multi-stage compressor; and a control module that controls the opening and closing of the first outlet and/or the second outlet on the cooling branch based on the temperature of the drive motor.

Optionally, a regulating valve for controlling the opening of the cooling branch is further provided between the inlet of the cooling branch and the drive motor.

Optionally, the control module controls the opening of the regulating valve on the cooling branch based on the temperature of the outlet downstream of the drive motor on the cooling branch and the intermediate suction pressure of the intermediate-stage suction port of the multi-stage compressor.

Optionally, the multi-stage compressor is a screw compressor or a centrifugal compressor.

In order to achieve at least one objective of the present application, in accordance with still another aspect of the present application, a method of drive motor cooling for an air conditioning system for use in the aforementioned air conditioning system is further provided, which comprises: detecting the temperature of the drive motor; when the temperature of the drive motor is greater than the preset cooling temperature, turning on the first branch; or, when the temperature of the drive motor is smaller than the preset cooling temperature, turning on the second branch.

Optionally, the method comprises: detecting the temperature of the outlet downstream of the drive motor on the cooling branch and the intermediate suction pressure of the intermediate-stage suction port of the multi-stage compressor; when the difference between the temperature of the outlet and the saturation temperature corresponding to the intermediate suction pressure is greater than the preset superheat temperature, increasing the opening of the regulating valve; or, when the difference between the temperature of the outlet and the saturation temperature corresponding to the intermediate suction pressure is smaller than the preset superheat temperature, decreasing the opening of the regulating valve.

According to the air conditioning system and the method of drive motor cooling therefor of the present application, by reasonably designing and selecting the outlet position of the cooling branch on the main circuit, and by regulating the opening of the regulating valve to regulate the refrigerant mass flow on the cooling branch, the system efficiency can be effectively maintained or improved while cooling the drive motor.

BRIEF DESCRIPTION OF THE DRAWINGS

FIG. 1 is a system schematic diagram of an embodiment of the air conditioning system of the present application.

DETAILED DESCRIPTION OF THE EMBODIMENT(S) OF THE INVENTION

The present application provides herein an embodiment of an air conditioning system 100. Referring to FIG. 1, the air conditioning system 100 comprises a main circuit 110 generally used to provide a refrigeration cycle and a cooling branch 120 for diverting flow from the main circuit 110 to provide cooling for the drive motor of the compressor. Wherein, the main circuit 110 comprises an exhaust port of a multi-stage compressor 111, a condenser 112, a throttling element 113 (e.g., an expansion device), an evaporator 114, and a suction port of the multi-stage compressor 111 that are connected by pipelines to form a loop. Specifically, the multi-stage compressor 111 refers to a compressor that can compress the refrigerant two or more times. For example, the multi-stage compressor 111 illustrated in the present embodiment has two compression stages, and the two compression stages are connected through a flow path between them, so as to achieve two compressions of the refrigerant. For example, referring to FIG. 1, the first compression stage of the multi-stage compressor 111 may have a first-stage suction port 111b and a first-stage exhaust port 111c, and the second compression stage may have an intermediate-stage suction port 111d and an intermediate-stage exhaust port 111e. Wherein, the refrigerant enters the compressor from the first-stage suction port 111b. After being compressed by the first compression stage, the refrigerant can flow out from the first-stage exhaust port 111c and flows into the second compression stage from the intermediate-stage suction port 111d to undergo compression again, and then flows out of the compressor from the intermediate-stage exhaust port 111e to participate in the cycle of the main circuit 110. Of course, if the multi-stage compressor illustrated has more intermediate stages, the refrigerant can flow through each of the intermediate stages to receive further compressions in the aforementioned manner. Specifically, it flows into the condenser 112 to release heat and condense into a liquid-phase refrigerant, expands and depressurizes through the throttling element 113, enters the evaporator 114 to absorb heat and evaporate, and then enters the compressor 111 again to start a new cycle of work.

In addition, the cooling branch 120 for diverting flow from the main circuit 110 to provide cooling for the drive motor of the compressor can be provided in such a manner that the inlet 120a of which is connected to the main circuit 110 between the condenser 112 and the throttling element 113, because the liquid-phase refrigerant here has a relatively high pressure, capable of providing sufficient mass flow for the branch and helping cool the drive motor. The outlet of the cooling branch 120 can be connected to at least one of the first-stage suction port 111b and the intermediate-stage suction port 111d of the multi-stage compressor 111, so that the refrigerant that has completed the motor cooling function can enter the compression stage to participate in a new cycle of work. Wherein, if only one outlet is provided for the cooling branch, it is without question that the only branch is used to perform the motor cooling function. If, however, two outlets are provided for the cooling branch at the same time, it can be selected according to the actual situation which branch is to be used to release the refrigerant that has completed the cooling function. For example, if the refrigerant is directly returned to the intermediate-stage suction port 111d of the compressor, a higher energy efficiency ratio can be brought to the entire system. However, if the suction and exhaust pressure difference brought about by the release to the intermediate-stage suction port 111d is small, the liquid supply may be insufficient, which will lead to insufficient cooling of the motor. At this time, the branch is not the optimal choice. As an alternative, it can be considered to return the refrigerant directly to the first-stage suction port 111b of the compressor, so as to provide certain pressure difference compensation.

Furthermore, the cooling branch 120 shall flow through the drive motor 111a of the multi-stage compressor 111 so as to cool it. In addition, a regulating valve 120b for controlling the opening of the cooling branch 120 can be provided on the cooling branch 120, and a control module e.g., a processor-based controller) of the air conditioning system 100 is provided to perform the corresponding control. For example, the control module can control the opening of the regulating valve 120b on the cooling branch 120 based on the temperature T4 of the outlet downstream of the drive motor 111a on the cooling branch 120 and the intermediate suction pressure P3 of the intermediate-stage suction port of the multi-stage compressor 111. Specifically, in order to cool the motor while ensuring that the refrigerant entering the first or intermediate stage of the compression stage is sufficiently overheated to be in a gaseous state, the intermediate suction pressure P3 can be used to obtain the corresponding saturated intermediate suction temperature, the temperature difference between the temperature T4 of the outlet downstream of the drive motor 111a and the saturated intermediate suction temperature can be used to obtain the superheat at the downstream of the drive motor 111a of the compressor, and the opening of the regulating valve 120b is controlled to ensure that the superheat here corresponds to the preset superheat, so as to ensure that the refrigerant which has completed the motor cooling function can enter the suction port of the compression stage in a gaseous form to avoid liquid shock.

Under such a configuration, the air conditioning system of the present embodiment, by reasonably designing and selecting the outlet position of the cooling branch on the main circuit, and by regulating the opening of the regulating valve to regulate the refrigerant mass flow on the cooling branch, can effectively maintain or improve system efficiency while cooling the drive motor.

As briefly described above, in one case, the cooling branch 120 may comprise a first branch 121 and a second branch 122 connected to the multi-stage compressor 111 from downstream of the drive motor 111a on the cooling branch 120. Wherein, the first branch 121 comprises a first valve 121b that controls the opening and closing thereof and a first outlet 121a connected to the first-stage suction port 111b of the multi-stage compressor 111; and the second branch 122 comprises a second valve 122b that controls the opening and closing thereof and a second outlet 122a connected to the intermediate-stage suction port of the multi-stage compressor 111. Therefore, when the cooling target for the motor can be met, it can be considered to close the first branch 121 and open the second branch 122, to improve system efficiency as much as possible. If, however, in some working conditions where the suction and exhaust pressure difference is low and efficiency improvement and motor cooling cannot be achieved at the same time, it can be considered to close the second branch 122 and open the first branch 121 to best cool the motor.

More specifically, the aforementioned control objective can be achieved by analyzing the temperature T3 of the drive motor 111a through a control module. For example, when the second outlet 122a is open (that is, the second valve 122b is open), and the first outlet 121a is closed (that is, the first valve 121b is closed), if the temperature T3 of the drive motor 111a is not higher than the set value, it is considered that the current cooling effect fully meets the motor cooling demand, and the current mode can be considered to be maintained to balance motor cooling and system efficiency. However, if the temperature T3 of the drive motor 111a is higher than the set value at this time, it is considered that the current cooling effect cannot meet the motor cooling demand, so it can be considered to close the second outlet 122a (i.e., close the second valve 122b), and open the first outlet 121a (i.e., open the first valve 121b) to further enhance the cooling of the motor.

In addition, more detailed improvements or model selections can be made to some parts of the air conditioning system to better match the foregoing embodiments.

For example, the hermetic multi-stage compressor 111 is usually a screw compressor or a centrifugal compressor.

As another example, the main circuit 110 may further comprise a filter drier 115, which is disposed between the condenser 112 and the throttling element 113 for drying the moisture and fileting the impurities in the system. Since it is pure liquid-phase refrigerant that flows out from the outlet of the condenser during normal operation, the resistance for the refrigerant to pass through the filter can be minimized.

In addition, a method of drive motor cooling for an air conditioning system is further provided herein, which can be used in the air conditioning system 100 of any of the foregoing embodiments or combinations thereof. Specifically, the method of drive motor cooling for an air conditioning system comprises: detecting the temperature T4 of the outlet downstream of the drive motor 111a on the cooling branch 120 and the intermediate suction pressure P3 of the intermediate-stage suction port of the multi-stage compressor 111; when the difference between the temperature T4 of the outlet and the saturation temperature corresponding to the intermediate suction pressure P3 is greater than the preset superheat temperature, it indicates that the liquid-phase refrigerant has evaporated too much when cooling the motor, so it can be considered to increase the opening of the regulating valve 120b to proportionally increase the amount of liquid-phase refrigerant introduced; or, when the difference between the temperature of the outlet and the saturation temperature corresponding to the intermediate suction pressure is smaller than the preset superheat temperature, it indicates that the liquid-phase refrigerant has not sufficiently evaporated when cooling the motor, so it can be considered to decrease the opening of the regulating valve 120b to proportionally reduce the amount of the liquid-phase refrigerant introduced.

In addition, when the cooling branch 120 of the air conditioning system to which the method is applied comprises at least two outlets, the method may further comprise: detecting the temperature T3 of the drive motor 111a and making a judgment; when the temperature T3 of the drive motor 111a is greater than a preset cooling temperature, the primary task should be cooling the motor, and the first branch 121 is turned on and the second branch 122 is closed at this time; or, when the temperature T3 of the drive motor 111a is smaller than the preset cooling temperature, system efficiency can be also be improved while cooling the motor, and the second branch 122 is turned on and the first branch 121 is closed at this time.

As a modification of the embodiment of the aforementioned air conditioning system and the embodiment of the corresponding cooling method, an embodiment of an air conditioning system can be additionally provided herein. The air conditioning system 100 comprises a main circuit 110 generally used to provide a refrigeration cycle and a cooling branch 120 for diverting flow from the main circuit to provide cooling for the drive motor of the compressor. Wherein, the main circuit is the same as the main circuit in the foregoing embodiment, so it will not be described here again. The cooling branch 120 can be arranged in such a manner that the inlet 120a of which is connected to the main circuit 110 between the condenser 112 and the throttling element 113, because the liquid-phase refrigerant here has a relatively high pressure, capable of providing sufficient mass flow for the branch and helping cool the drive motor. In addition, the cooling branch 120 should flow through the drive motor 111a of the multi-stage compressor 111 so as to cool it. Furthermore, the cooling branch 120 may further comprise a first branch 121 and a second branch 122 connected to the multi-stage compressor 111 from downstream of the drive motor 111a. Wherein, the first branch 121 comprises a first valve 121b that controls the opening and closing thereof and a first outlet 121a connected to the first-stage suction port 111b of the multi-stage compressor 111; and the second branch 122 comprises a second valve 122b that controls the opening and closing thereof and a second outlet 122a connected to the intermediate-stage suction port of the multi-stage compressor 111. Still further, the air conditioning system should further comprise a control module for performing the corresponding control, which can control the opening and closing of the first outlet 121a and/or the second outlet 122a on the cooling branch 120 based on the temperature T3 of the drive motor 111a.

Under such a configuration, since the cooling branch has two branches, it can be selected according to the actual situation which branch is to be used to release the refrigerant that has completed the cooling function. For example, if the refrigerant is directly returned to the intermediate-stage suction port 111d of the compressor, a higher energy efficiency ratio can be brought to the entire system. However, if the suction and exhaust pressure difference brought about by the release to the intermediate-stage suction port 111d is small, the liquid discharge may be insufficient, which will lead to insufficient cooling of the motor. At this time, the branch is not the optimal choice. As an alternative, it can be considered to return the refrigerant directly to the first-stage suction port 111b of the compressor, so as to provide certain pressure difference compensation. Therefore, when the cooling target for the motor can be met, it can be considered to close the first branch 121 and open the second branch 122 to improve system efficiency as much as possible. If, however, in some working conditions where the suction and exhaust pressure difference is low and efficiency improvement and motor cooling cannot be achieved at the same time, it can be considered to close the second branch 122 and open the first branch 121 to best cool the motor. More specifically, when the second outlet 122a is open and the first outlet 121a is closed, if the temperature T3 of the drive motor 111a is not higher than the set value, it is considered that the current cooling effect fully meets the motor cooling demand, and the current mode can be considered to be maintained to balance motor cooling and system efficiency. However, if the temperature T3 of the drive motor 111a is higher than the set value at this time, it is considered that the current cooling effect cannot meet the motor cooling demand, so it can be considered to close the second outlet 122a and open the first outlet 121a to further enhance the cooling of the motor.

Furthermore, a regulating valve 120b for controlling the opening of the cooling branch 120 can further be provided between the inlet 120a of the cooling branch 120 and the drive motor 111a. More specifically, a control module of the air conditioning system 100 can be provided to perform the corresponding control. For example, the control module can control the opening of the regulating valve 120b on the cooling branch 120 based on the temperature T4 of the outlet downstream of the drive motor 111a on the cooling branch 120 and the intermediate suction pressure P3 of the intermediate-stage suction port of the multi-stage compressor 111. Specifically, in order to cool the motor while ensuring that the refrigerant entering the first or intermediate stage of the compression stage is sufficiently overheated to be in a gaseous state, the intermediate suction pressure P3 can be used to obtain the corresponding saturated intermediate suction temperature, the temperature difference between the temperature T4 of the outlet downstream of the drive motor 111a and the saturated intermediate suction temperature can be used to obtain the superheat at the downstream of the drive motor 111a of the compressor, and the opening of the regulating valve 120b is controlled to ensure that the superheat here corresponds to the preset superheat, so as to ensure that the refrigerant which has completed the motor cooling function can enter the suction port of the compression stage in a gaseous form to avoid liquid shock.

In addition, similarly, more detailed improvements or model selections can be made to some parts of the air conditioning system to better match the foregoing embodiments.

For example, the hermetic multi-stage compressor 111 is usually a screw compressor or a centrifugal compressor.

As another example, the main circuit 110 may further comprise a filter drier 115, which is disposed between the condenser 112 and the throttling element 113 for drying the moisture and fileting the impurities in the system. Since it is pure liquid-phase refrigerant that flows out from the outlet of the condenser during normal operation, the resistance for the refrigerant to pass through the filter can be minimized.

Similarly, a method of drive motor cooling for an air conditioning system is further provided herein, which can be used in the air conditioning system of any of the foregoing embodiments or combinations thereof. Specifically, the method of drive motor cooling for an air conditioning system comprises: detecting the temperature T3 of the drive motor 111a and making a judgment; when the temperature T3 of the drive motor 111a is greater than a preset cooling temperature, the primary task should be cooling the motor, and the first branch 121 is turned on at this time; or, when the temperature T3 of the drive motor 111a is smaller than the preset cooling temperature, system energy can be also be improved while cooling the motor, and the second branch 122 is turned on at this time.

In addition, when the cooling branch 120 of the air conditioning system to which the method is applied further comprises a regulating valve 120b provided thereon, the method may further comprise: detecting the temperature T4 of the outlet downstream of the drive motor 111a on the cooling branch 120 and the intermediate suction pressure P3 of the intermediate-stage suction port of the multi-stage compressor 111; when the difference between the temperature T4 of the outlet and the saturation temperature corresponding to the intermediate suction pressure P3 is greater than the preset superheat temperature, it indicates that the liquid-phase refrigerant has evaporated too much when cooling the motor, so it can be considered to increase the opening of the regulating valve 120b to proportionally increase the amount of liquid-phase refrigerant introduced; or, when the difference between the temperature of the outlet and the saturation temperature corresponding to the intermediate suction pressure is smaller than the preset superheat temperature, it indicates that the liquid-phase refrigerant has not sufficiently evaporated when cooling the motor, so it can be considered to decrease the opening of the regulating valve 120b to proportionally reduce the amount of liquid-phase refrigerant introduced.

The working process of the air conditioning system of the present application will be described in conjunction with the foregoing embodiments and FIG. 1 as follows. First, in the main circuit 110, the gas-phase refrigerant enters the compressor from the first-stage suction port 111b of the compressor 111. After being compressed by the first compression stage, the refrigerant can flow out from the first-stage exhaust port 111c and flows into the second compression stage from the intermediate-stage suction port 111d to undergo compression again, and then flows out of the compressor from the intermediate-stage exhaust port 111e to flow into the condenser 112 to release heat and condense into a liquid-phase refrigerant.

Then the refrigerant is divided into two parts, the main part of which flows into the throttling element 113 to expand and depressurize, enters the evaporator 114 to absorb heat and evaporate, and then enters the compressor 111 again to start a new cycle of work. The other part of the refrigerant is introduced into the cooling branch 120 through the inlet 120a, and then flows through the drive motor 111a of the compressor to cool it after being regulated by the regulating valve 120b. Here, the regulation of the regulating valve 120b is related to the temperature T4 of the outlet downstream of the drive motor 111a on the cooling branch 120 and the intermediate suction pressure P3 of the intermediate-stage suction port of the multi-stage compressor 111: when the difference between the temperature T4 of the outlet and the saturation temperature corresponding to the intermediate suction pressure P3 is greater than the preset superheat temperature, it indicates that the liquid-phase refrigerant has evaporated too much when cooling the motor, so it can be considered to increase the opening of the regulating valve 120*b* to proportionally increase the amount of liquid-phase refrigerant introduced; or, when the difference between the temperature T4 of the outlet and the saturation temperature corresponding to the intermediate suction pressure P3 is smaller than the preset superheat temperature, it indicates that the liquid-phase refrigerant has not sufficiently evaporated when cooling the motor, so it can be considered to decrease the opening of the regulating valve 120*b* to proportionally reduce the amount of liquid-phase refrigerant introduced.

The refrigerant that has completed the cooling function continues to flow along the cooling branch 120 to prepare to flow back into the main circuit 110. At this time, it can choose to return to the first-stage suction port 111*b* of the compressor via the first outlet 121*a* of the first branch 121, or can choose to return to the intermediate-stage suction port 111*d* of the compressor via the second outlet 122*a* of the second branch 122. The specific method of controlling the opening of the branch is related to the temperature T3 of the drive motor 111*a*: when the temperature T3 of the drive motor 111*a* is greater than a preset cooling temperature, the primary task should be cooling the motor, and the first branch 121 is turned on at this time; or, when the temperature T3 of the drive motor 111*a* is smaller than the preset cooling temperature, system efficiency can be also be improved while cooling the motor, and the second branch 122 is turned on at this time. Thus, the entire working process of the air conditioning system is realized.

The above examples mainly illustrate the air conditioning system and the method of drive motor cooling therefor of the present application. Although only some of the embodiments of the present application are described, those skilled in the art understand that the present application can, without departing from the spirit and scope of the invention, be implemented in many other forms. Therefore, the illustrated examples and embodiments are to be considered as illustrative but not restrictive, and the present application may cover various modifications or replacements if not departed from the spirit and scope of the present application as defined by the appended claims

What is claimed is:

1. An air conditioning system, comprising:
   a main circuit having a multi-stage compressor, a condenser, a throttling element and an evaporator connected by pipelines;
   a cooling branch, the inlet of which is connected to the main circuit between the condenser and the throttling element, and the outlet of which is connected to at least one of the first-stage suction port and the intermediate-stage suction port of the multi-stage compressor, wherein the cooling branch flows through the drive motor of the multi-stage compressor, and a regulating valve for controlling the cooling branch is provided on the cooling branch; and
   a control module that controls the opening of the regulating valve on the cooling branch based on the temperature of the outlet downstream of the drive motor on the cooling branch and the intermediate suction pressure of the intermediate-stage suction port of the multi-stage compressor;
   wherein the cooling branch comprises a first branch and a second branch connected to the multi-stage compressor from downstream of the drive motor on the cooling branch; wherein, the first branch comprises a first valve that controls the opening and closing thereof and a first outlet connected to the first-stage suction port of the multi-stage compressor; and the second branch comprises a second valve that controls the opening and closing thereof and a second outlet connected to the intermediate-stage suction port of the multi-stage compressor.

2. The air conditioning system according to claim 1, wherein the multi-stage compressor is a screw compressor or a centrifugal compressor.

3. A cooling method for a drive motor of an air conditioning system for use in the air conditioning system including:
   a main circuit having a multi-stage compressor, a condenser, a throttling element and an evaporator connected by pipelines;
   a cooling branch, the inlet of which is connected to the main circuit between the condenser and the throttling element, and the outlet of which is connected to at least one of the first-stage suction port and the intermediate-stage suction port of the multi-stage compressor, wherein the cooling branch flows through the drive motor of the multi-stage compressor, and a regulating valve for controlling the cooling branch is provided on the cooling branch; and
   a control module that controls the opening of the regulating valve on the cooling branch based on the temperature of the outlet downstream of the drive motor on the cooling branch and the intermediate suction pressure of the intermediate-stage suction port of the multi-stage compressor;
   the method comprising:
   detecting the temperature of the outlet downstream of the drive motor on the cooling branch and the intermediate suction pressure of the intermediate-stage suction port of the multi-stage compressor;
   when the difference between the temperature of the outlet and the saturation temperature corresponding to the intermediate suction pressure is greater than the preset superheat temperature, increasing the opening of the regulating valve; or, when the difference between the temperature of the outlet and the saturation temperature corresponding to the intermediate suction pressure is smaller than the preset superheat temperature, decreasing the opening of the regulating valve.

4. The cooling method for a drive motor according to claim 3, comprising:
   detecting the temperature of the drive motor;
   when the temperature of the drive motor is greater than a preset cooling temperature, turning on the first branch; or
   when the temperature of the drive motor is smaller than the preset cooling temperature, turning on the second branch.

5. An air conditioning system, comprising:
   a main circuit having a multi-stage compressor, a condenser, a throttling element and an evaporator connected by pipelines;
   a cooling branch, the inlet of which is connected to the main circuit between the condenser and the throttling element, wherein the cooling branch flows through the drive motor of the multi-stage compressor, and wherein the cooling branch further comprises a first branch and a second branch connected to the multi-stage compressor from downstream of the drive motor; wherein, the first branch comprises a first valve that controls the opening and closing thereof and a first outlet connected to the first-stage suction port of the multi-stage compressor; and the second branch comprises a second valve that controls the opening and closing thereof and a second outlet connected to the intermediate-stage suction port of the multi-stage compressor; and a control module that controls the opening and closing of the first outlet and/or the second outlet on the cooling branch based on the temperature of the drive motor.

6. The air conditioning system according to claim 5, wherein a regulating valve for controlling the cooling branch is further provided between the inlet of the cooling branch and the drive motor.

7. The air conditioning system according to claim 6, wherein the control module controls the opening of the regulating valve on the cooling branch based on the temperature of the outlet downstream of the drive motor on the cooling branch and the intermediate suction pressure of the intermediate-stage suction port of the multi-stage compressor.

8. The air conditioning system according to claim 5, wherein the multi-stage compressor is a screw compressor or a centrifugal compressor.

9. A cooling method for a drive motor of an air conditioning system for use in the air conditioning system according to claim 6, comprising:

detecting the temperature of the drive motor;

when the temperature of the drive motor is greater than the preset cooling temperature, turning on the first branch; or when the temperature of the drive motor is smaller than the preset cooling temperature, turning on the second branch.

10. The cooling method for a drive motor according to claim 9, comprising:

detecting the temperature of the outlet downstream of the drive motor on the cooling branch and the intermediate suction pressure of the intermediate-stage suction port of the multi-stage compressor;

when the difference between the temperature of the outlet and the saturation temperature corresponding to the intermediate suction pressure is greater than the preset superheat temperature, increasing the opening of the regulating valve; or, when the difference between the temperature of the outlet and the saturation temperature corresponding to the intermediate suction pressure is smaller than the preset superheat temperature, decreasing the opening of the regulating valve.

\* \* \* \* \*